United States Patent
Klinkner et al.

(10) Patent No.: US 10,992,797 B2
(45) Date of Patent: Apr. 27, 2021

(54) TRACKING FUNCTIONALITY STANDBY MODE FOR THIRD PARTY ELECTRONIC DEVICES

(71) Applicant: Tile, Inc., San Mateo, CA (US)

(72) Inventors: Steven R. Klinkner, Palo Alto, CA (US); Josselin de la Broise, Mountain View, CA (US); Michael George Farley, Foster City, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

(21) Appl. No.: 16/447,972

(22) Filed: Jun. 21, 2019

(65) Prior Publication Data

US 2020/0404091 A1   Dec. 24, 2020

(51) Int. Cl.
*H04M 1/725* (2021.01)
*H04W 4/029* (2018.01)
*H04W 88/02* (2009.01)

(52) U.S. Cl.
CPC ....... *H04M 1/72563* (2013.01); *H04W 4/029* (2018.02); *H04W 88/02* (2013.01)

(58) Field of Classification Search
None
See application file for complete search history.

(56) References Cited

U.S. PATENT DOCUMENTS

| | | | | |
|---|---|---|---|---|
| 5,587,715 A | * | 12/1996 | Lewis | G01S 19/07 342/357.24 |
| 8,301,158 B1 | * | 10/2012 | Thomas | H04W 8/10 455/456.1 |
| 9,195,799 B2 | * | 11/2015 | Sze | G16H 40/67 |
| 9,282,582 B1 | * | 3/2016 | Dunsbergen | H04W 48/12 |
| 2009/0160639 A1 | * | 6/2009 | Chu | B60R 25/24 340/539.11 |
| 2013/0195085 A1 | * | 8/2013 | Lambert | H04W 8/005 370/336 |
| 2015/0318723 A1 | * | 11/2015 | Brockman | H01M 10/4257 307/117 |
| 2017/0150531 A1 | * | 5/2017 | Horbatt | H04W 24/02 |
| 2017/0352250 A1 | * | 12/2017 | de Barros Chapiewski | H04W 4/029 |
| 2018/0308293 A1 | * | 10/2018 | DeCia | H04N 7/181 |
| 2018/0336513 A1 | * | 11/2018 | Smith | G05B 19/406 |
| 2018/0336738 A1 | * | 11/2018 | Gibbs | G07B 15/02 |

* cited by examiner

*Primary Examiner* — German Viana Di Prisco
(74) *Attorney, Agent, or Firm* — Fenwick & West LLP

(57) ABSTRACT

An electronic device with a primary functionality and a tracking functionality can be used in a centralized tracking system. A controller configures the electronic device to operate in one of a set of: an "on" mode, an "off" mode, a first standby mode, and a tracking standby mode. While configured to operate in the "on" mode, the primary and tracking functionality of the electronic device are enabled, and while configured to operate in the "off" mode, both are disabled. While configured to operate in the first standby mode, the tracking functionality is enabled and the primary functionality is limited. While configured to operate in the tracking standby mode, the primary functionality is disabled but the tracking functionality is enabled, enabling the electronic device to be located while the primary functionality is disabled and saving power relative to the first standby mode and the "on" mode.

22 Claims, 10 Drawing Sheets

TRACKING FUNCTIONALITY STANDBY MODE FOR THIRD PARTY ELECTRONIC DEVICES

BACKGROUND

This disclosure relates generally to tracking devices, and more specifically, to configuring electronic devices for use in a centralized tracking system.

Users can attach tracking devices to one or more personal objects, such as keys, a phone, a car, a briefcase, and the like. The tracking device can communicatively couple to a mobile device of the user (or of a community member), and the mobile device can, in response to receiving a communication from the tracking device, determine a location of the mobile device (for instance, via a GPS receiver). The mobile device can then provide an identifier for the tracking device and the determined location of the mobile device to a cloud server, which can associate the tracking device with the determined location of the mobile device. Users can then query the cloud server to identify the location of objects to which the tracking devices are coupled.

Figure 1:
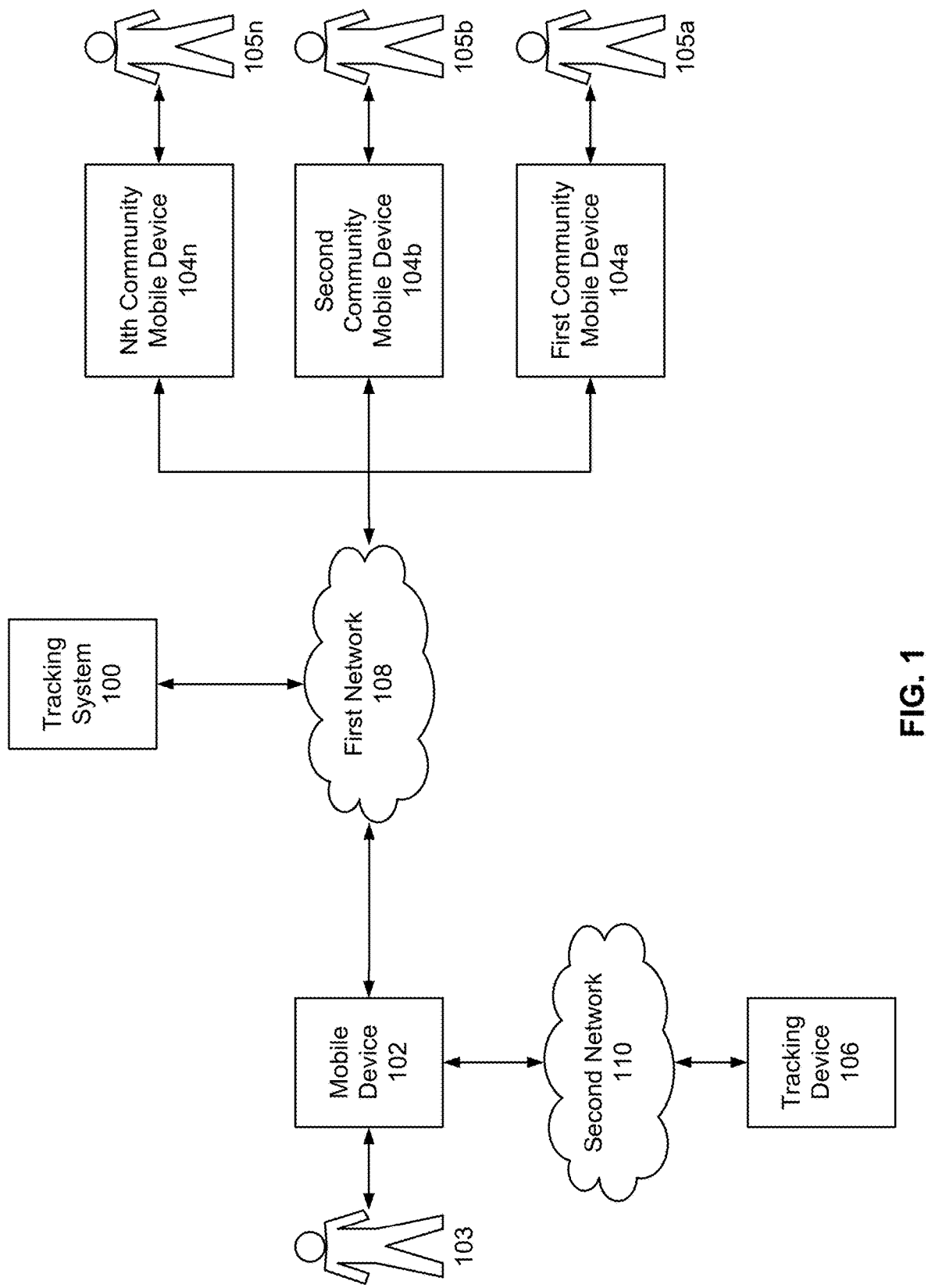
FIG. 1 illustrates an example tracking system environment in which a tracking device can operate, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. Or, a tracking device can be a device with a primary purpose unrelated to tracking functionality (e.g., a set of headphones, an electronic key, a wireless speaker, a fitness tracker, a camera) that has an integrated tracking component that allows the device to be tracked. The user can then use a mobile device (e.g., by way of a software application installed on the mobile device) or other device or service to track the tracking device. For example, the mobile device can perform a local search for a tracking device. However, in situations where the user is unable to locate the tracking device using their own mobile device (e.g., if the tracking device is beyond a distance within which the mobile device and the tracking device can communicate), the user can leverage the capabilities of a community of users of a tracking device system as described below.

A tracking system (also referred to herein as a "cloud server," "tracking server," or simply "server") can maintain user profiles associated with a plurality of users of the tracking system. The tracking system can associate each user within the system with one or more tracking devices associated the user (e.g., tracking devices that the user has purchased and is using to track objects owned by the user, or devices that include a tracking component and have additional non-tracking features). If the user's tracking device, or the object to which the tracking device is attached, becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a wireless speaker can include tracking device components that allow a user to track and/or locate the wireless speaker. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
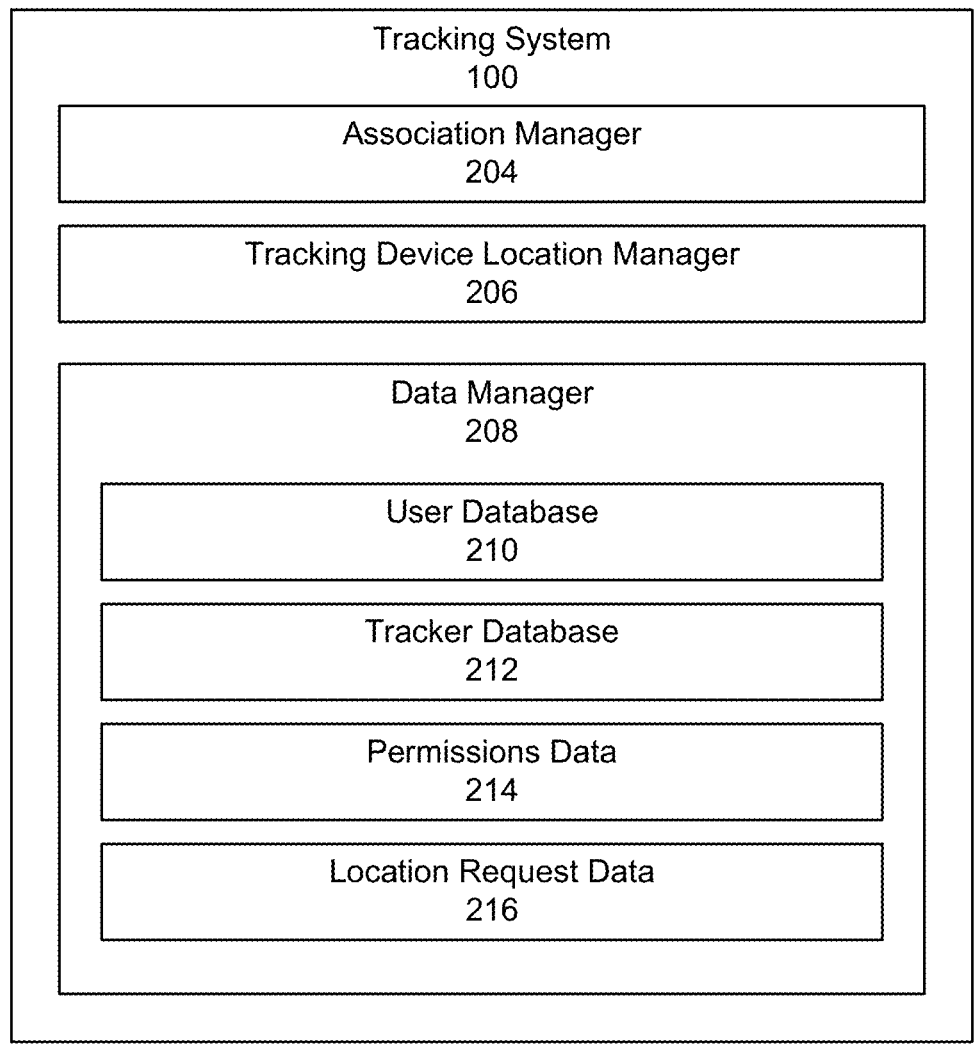
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
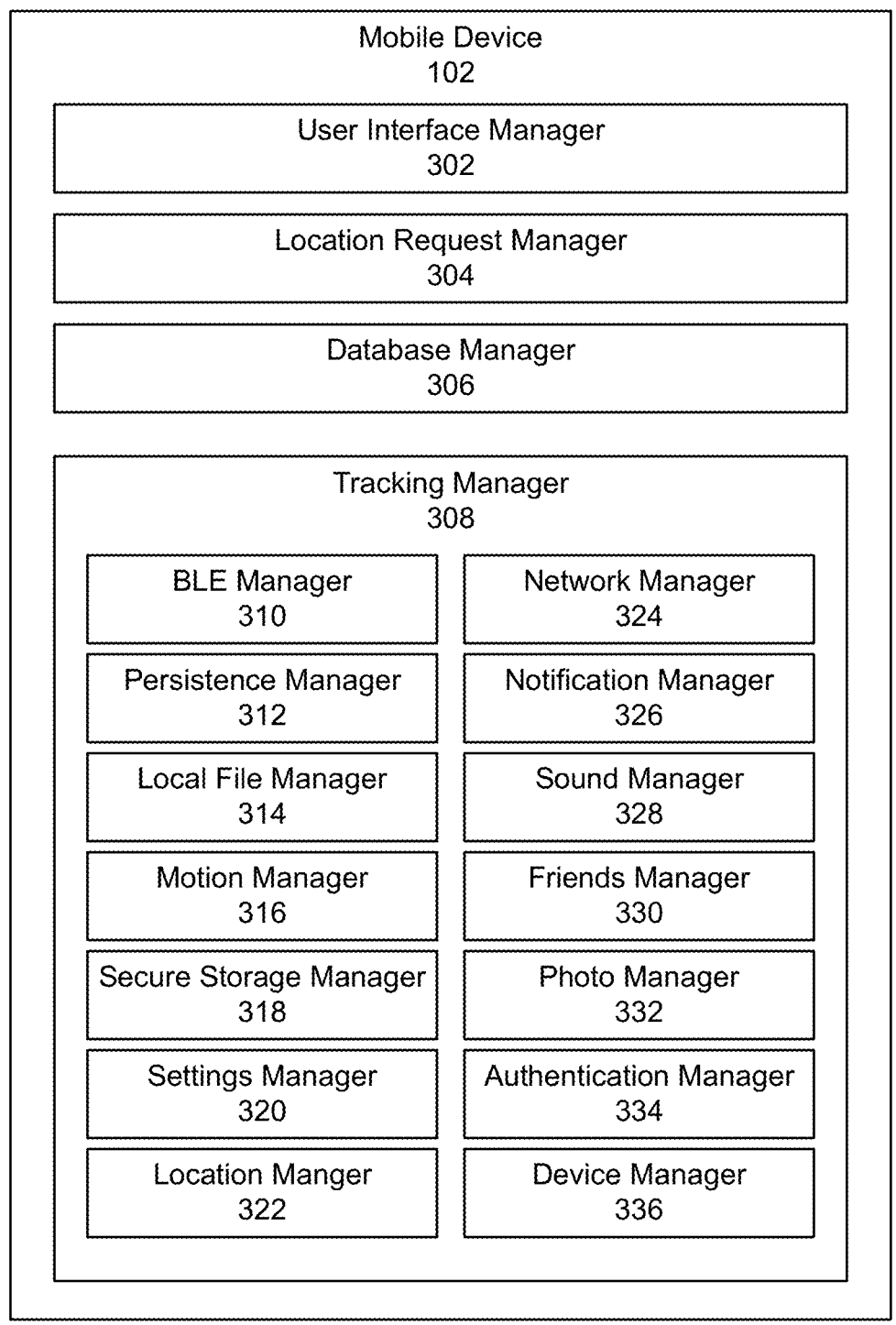
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable, from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
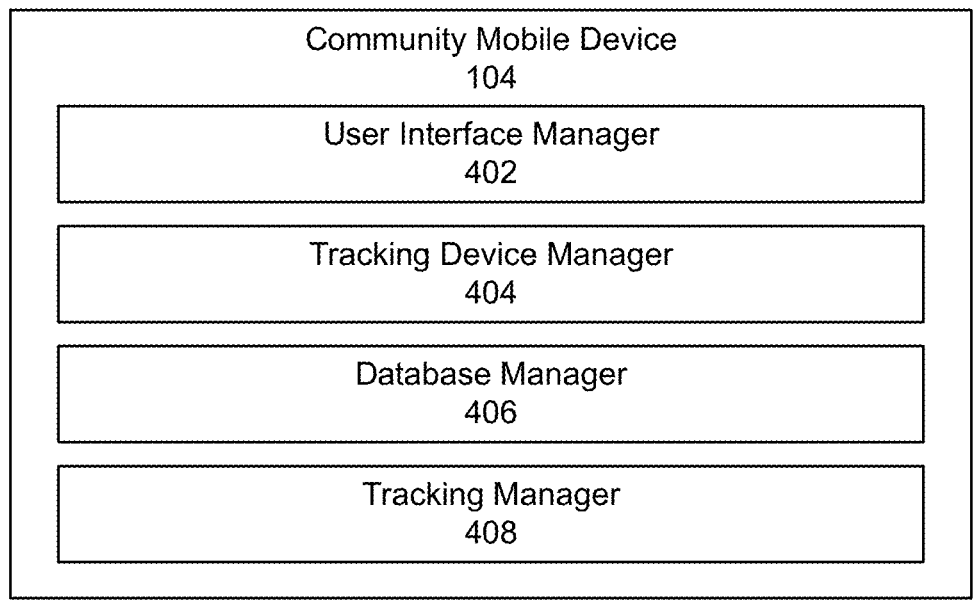
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
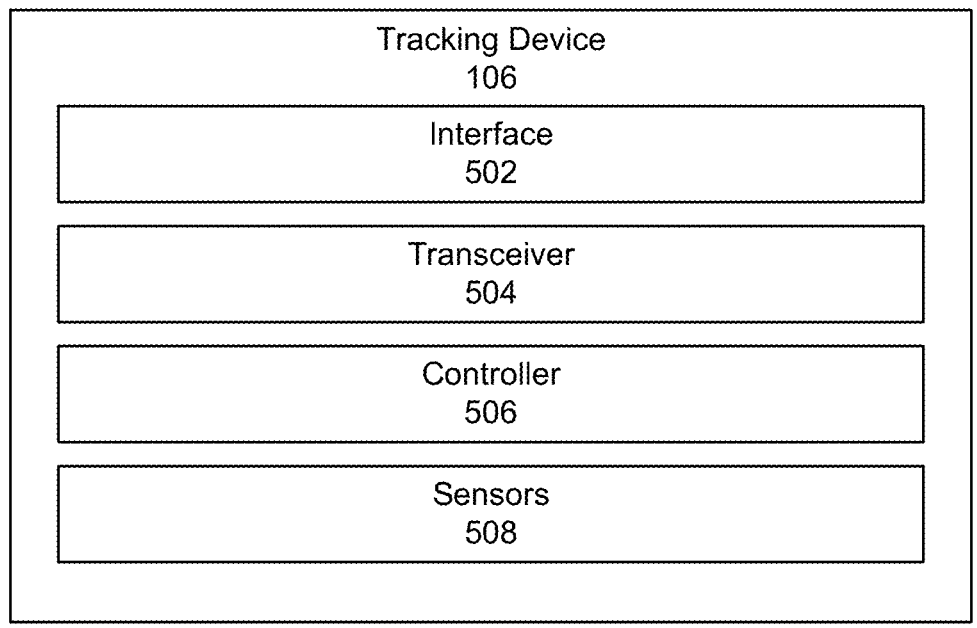
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506.

Tracking Standby Mode for Third Party Electronic Devices

As noted above, a user can commission an electronic device, for instance a device with a primary function other than tracking, for use in the tracking system 100. In one embodiment, the electronic device may be manufactured by a third-party, such as a manufacturer or company other than an entity responsible for operation of the tracking system 100. Once an electronic device is commissioned to operate with the tracking system 100, tracking and location functionality can be enabled within the electronic device, thus enabling the electronic device to operate as a tracking device within the tracking system 100.

Figure 6:
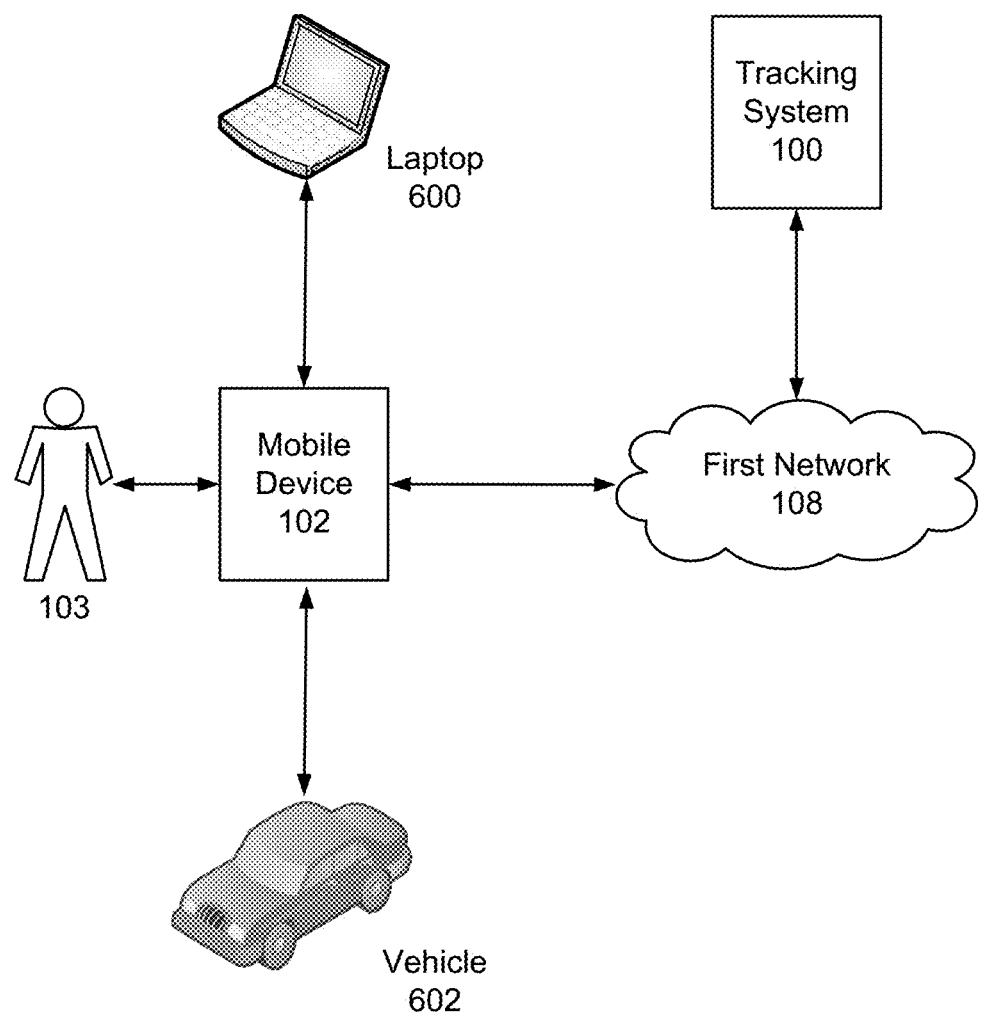
FIG. 6 illustrates an example tracking system environment in which an electronic device can be commissioned to operate, according to one embodiment.

FIG. 6 illustrates an example tracking system environment in which an electronic device can be commissioned to operate, according to one embodiment. The environment of FIG. 6 includes a user 103 with a mobile device 102 communicatively coupled to a tracking system 100 via the first network 108. In addition, the environment of FIG. 6 includes two electronic devices for commissioning with the tracking system 100, but with a primary function other than tracking: a laptop 600 and a vehicle 602.

It should be noted that although FIG. 6 illustrates a laptop and a vehicle, other types of electronic devices may be commissioned to operate with the tracking system 100, such as a pair of headphones, a tablet computer, a piece of luggage, a backpack, an electronic wallet, a smart key, a smart watch, or any other electronic device equipped with functionality to operate as a tracking device (for instance, any electronic device with Bluetooth functionality or any device that is configured to communicate with the mobile device 102). In some embodiments, the electronic devices are not registered with the tracking system 100 prior to commissioning, and thus are unable to communicate with the tracking 100, either directly or via the mobile device 102. In other embodiments, the electronic devices are able to communicate with the tracking system 100, either directly or via the mobile device 102.

After commissioning an electronic device, the electronic device can operate as a tracking device as described above, for instance by providing an identifier to the mobile device 102, which in turn determines a location of the mobile device and provides the identifier of the electronic device and the location of the mobile device to the tracking system 100 (which in turn associates the identifier with the location).

In some embodiments, the user 103 commissions an electronic device for operation with the tracking system 100 for security purposes. For instance, once the electronic device is commissioned, the user can locate and keep track of the device by requesting a location of the electronic device from the tracking system 100, via a tracking application executed by the mobile device 102. In such embodiments, the tracking system 100 receives locations of the electronic device from other mobile devices that communicatively couple with the electronic device when within communicative range of the electronic device, and provides one or more of these received locations to the user when requested (or when the distance between the user and the electronic device exceeds a threshold). For example, if the user 103 parks the vehicle 602, which has been commissioned for use within the tracking system 100, and the vehicle 602 is stolen and moved to a location that is beyond the communication range of the mobile device 102, the mobile device 102 may notify the user 103. Thus, the commissioned electronic device ultimately functions as a tracking device within the tracking system 100 environment.

An electronic device operating within the tracking system 100 may have a primary functionality other than tracking functionality. Separate electronic circuits powered by a power source are configured to enable the primary functionality and tracking functionality in the electronic device. The primary functionality of an electronic device can be independent of the tracking functionality of the device. For example, the laptop 600 may primarily be used to connect the user 103 to the WiFi via a router for using email, social networking systems, and other online systems or allow the user 103 to play music, videos, or virtual games. Alternatively, the vehicle 602 may primarily be used to transport the user 103 between locations. Likewise, the primary functionality of a pair of headphones with tracking functionality is to play music or audio, the primary functionality of a smartwatch with tracking functionality is to display the time, and the primary functionality of a tablet computer with tracking functionality can be watching videos.

Such electronic devices may operate in multiple modes, such as a fully operational or "on" mode, a fully disabled or "off" mode, a first standby mode (where the primary functionality of the electronic device is limited), and a second standby mode or tracking standby mode (where the primary functionality of the electronic device is disabled but the tracking functionality of the electronic device is operational). A controller within the electronic device is configured to configure the electronic device to operate in one of these modes, and to switch between the modes. While in the "on" mode, the electronic device has full functionality, which includes both the primary functionality and the tracking functionality of the electronic device, according to an embodiment. While in off mode, the electronic device has no functionality, and tracking functionality is disabled. In the first standby mode, the electronic device is in a low power state but maintains restricted primary functionality, such as receiving messages on the laptop 600 or playing the radio in the vehicle 602, and maintains full tracking functionality. In some embodiments, the electronic device can only run background operations when primary functionality is restricted. The electronic device can quickly transition from standby mode to on mode. In the second standby mode, the primary functionality of the electronic device is fully disabled, but the tracking functionality of the electronic device is fully enabled. The second standby mode uses less power than the first standby mode while preserving the ability of a user to locate the electronic device. For example, the second standby mode may be able to operate at 1 milliwatt hour per day, which may provide at least a year of power for operation in the second standby mode.

In certain operating conditions, the electronic device has limited battery power, making power conservation of interest to a user. When the electronic device is in the "on" mode, the electronic device is using power saved by a battery within the electronic device to enable full functionality. The first standby mode requires less power than on mode since the device is only enabling some of the primary functionality. In some embodiments, a user switches the electronic device to the first standby mode with a physical switch or software switch. Likewise, the electronic device can enter the first standby mode when the device has not been used or interacted with for a threshold period of time. In the "off" mode, the electronic device is not using power for either the primary functionality or the tracking functionality. The user may configure the electronic device to operate in the "off" mode using a hard power switch, such as a switch that physically separates the power source from the electronic circuits that control the functionality of the electronic device. This may save power relative to the "on" mode, the first standby more, and the second standby mode. Though the "off" mode uses the least amount of power of the operating modes described herein, because the tracking functionality is disabled, the electronic device cannot be tracked, and if lost, the user cannot use the tracking system 100 to find the electronic device. In some embodiments, the electronic device may not include an "off" mode. In these embodiments, the electronic device is never fully disconnected from power, and instead of turning the electronic device off, a user may configure the electronic device to operate in the second standby mode. This may act as a theft deterrent since the electronic device can still be tracked while operating in the second standby mode, which would not be possible if the electronic device was in "off" mode. It should also be noted that in some embodiments, the electronic device may be configured to operate in either the "on" mode or the second standby mode (e.g., the electronic device may not be configured to operate in the first standby mode or the "off" mode).

As noted above, while operating in the second or tracking standby mode, the primary functionality of the electronic device is disabled while the tracking functionality is preserved. For example, the audio ability of a pair of headphones can be disabled, but the headphones can still transmit advertisement beacon signals, allowed nearby mobile devices to receive the beacon signals and provide an identity of the headphones in conjunction with a detected location to the tracking system 100.

The electronic device can include a switch (such as a soft power switch) that a user can toggle or interact with to configure the electronic device to operate in the tracking standby mode. The switch can be electronically coupled to a first electronic circuit associated with the primary functionality of the electronic device, and to a second electronic circuit (such as a Bluetooth Low-Energy or "BLE" transceiver) associated with the tracking functionality of the electronic device. When the electronic device is configured to operate in the tracking standby mode, the switch decouples the first electronic circuit from the power source of the electronic device while maintaining the electronic coupling between the second electronic circuit and the power source. This enables the electronic device to have tracking functionality without powering the rest of the electronic device. In some embodiments, the electronic device may contain a system board for the primary functionality of the electronic device. A fractional portion of the system board may support BLE functionality and be isolated from the rest of the system board for power consumption. For example, a mobile phone may include a system board with cellular radio, BLE functionality, and WiFi functionality.

In some embodiments, the electronic device includes both a soft power switch and a hard power switch. The soft power switch can enable the user to toggle between a different set of operating modes than the hard power switch. For instance, a user can use the soft power switch to configure the electronic device to operate in the tracking standby mode, but must use the hard power switch to configure the electronic device to operate in the "off" mode. In some embodiments, the electronic device only has one switch (either a soft switch or a hard switch), and a user can configure the electronic device to operate in any of the above-referenced operating modes. In some embodiments, a first switch (such as a soft power switch) can be coupled to a separate power source than a second switch (such as a hard power switch). Likewise, in some embodiments, the electronic circuit associated with a device's primary functionality can be coupled to a separate power source than the electronic circuit associated with a device's tracking functionality.

In some embodiments, the tracking standby mode takes priority over the "off" mode such that a switch or configuration interface associated with the tracking standby mode must be configured to disable the tracking standby mode in order for the device to be configured in the "off" mode. This can prevent a user from inadvertently disabling the tracking functionality of an electronic device when powering down the primary functionality of the device. In such embodiments, when the device is operating (for example) in the "on" mode and the user interacts with a switch to configure the electronic device in the "off" mode, the device is instead configured in the tracking standby mode unless the user has explicitly disabled the tracking standby mode. For example, the tracking standby mode may be disabled after proper authentication by the user on the electronic device or via an application on the mobile device 102. In further embodiments, the switch or configuration interface enabling tracking standby mode is located on a different device (such as a mobile phone).

In some embodiments, the electronic device maintains some background functionality when operating in the first standby mode so that the full primary functionality of the electronic device can be quickly restored for use at any time. For example, earbuds may start receiving audio signals as soon as they are placed within a user's ears and need to quickly be configured to play the audio signals. Electronic devices such as these may require more sensors to be ready for use at any time than the average electronic, increasing the cost of the electronic device and the amount of power required for full functionality. However, in many cases, these electronic devices only need to be ready to be use when a mobile device is nearby. Returning to the previous example, the earbuds can be configured to operate with full primary functionality (or in the "on" mode) when they are within a threshold proximity to a mobile device. When they are outside this threshold proximity, the earbuds may be configured to operate in the first standby mode or the tracking standby mode. However, once the move within the threshold proximity (e.g., once the earbuds are within range of a signal transmitted by the mobile phone), the earbuds can be configured to operate in the "on" mode, enabling a user to choose a song to play on the mobile device and have the earbuds immediately begin playing the song. Alternatively, the presence of a mobile device may be used to imply the presence of the user, who may travel around more often with the mobile device than with other electronic devices. To save power, the electronic device may be configured to operate in the tracking standby mode while the mobile device is a threshold distance away from the electronic device. Once the mobile device (and presumably the user) reaches or moves within the threshold distance to the electronic device, the mobile device may signal to the tracking device 106 within the electronic device to configure the device to operate in the first standby mode so that the electronic device is ready for use.

In some embodiments, the electronic device can be automatically configured to operate in the tracking standby mode in response to a trigger criteria being satisfied. For instance, the electronic device can be configured to operate in the tracking standby mode in response to an amount of power available to the electronic device falling below a threshold level, thereby enabling the electronic device to continue to be tracked and/or located even when the electronic device does not have enough power to power the primary functionality of the electronic device. Likewise, the electronic device can be configured to operate in the tracking standby mode after operating in the first standby mode for a threshold amount of time, after not having received an input or interaction from a user for the threshold amount of time, or both. In some embodiments, the electronic device, while configured to operate in the tracking standby mode, can be automatically configured to operate in the first standby mode or the "on" mode, for instance in response to being plugged into a power source, in response to an amount of power available to the electronic device exceeding a threshold, in response to receiving an input or interaction by a user, in response to detecting movement of the electronic device, or in response to any other suitable criteria.

Although two standby modes are described above, it should be noted that in some embodiments, the electronic device can be configured to operate in a third standby mode (or a "second tracking standby mode"). In the second tracking standby mode, the primary functionality of the electronic device is disabled, and the tracking functionality of the electronic device is limited relative to the tracking standby mode. For instance, when configured to operate in the tracking standby mode, the electronic device can be configured to advertise tracking signals at a first frequency and a first power, and when configured to operate in the second tracking standby mode, the electronic device can be configured to advertise tracking signals at a second frequency and second power, wherein the second frequency is slower than the first frequency, the second power is lower than the first power, or both. The second tracking standby mode uses less power than the tracking standby mode, beneficially allowing the electronic device to retain some tracking functionality while improving power savings relative to the tracking standby mode. In some embodiments, the tracking device can be configured to operate in the second tracking standby mode in response to a user input, automatically in response to an amount of power available to the electronic device falling below a threshold, in response to the electronic device being configured to operate in the tracking standby mode for a threshold amount of time, in response to the electronic device being configured to operate in the tracking standby mode and the electronic device moving to a safe zone (a geographic area in which the probability that the electronic device will be lost is lower than outside the geographic area), or in response to any other suitable condition. In other embodiments, the tracking standby mode may be configured to advertise tracking signals at different frequencies and powers instead of using a second tracking standby mode. The user may choose from various options for frequency and power or enter customized frequency and power values via the mobile device 102.

It should also be noted that in some embodiments, the electronic device described herein can be configured to operate in the "on" mode, the "off" mode, and the tracking standby mode, but not the first standby mode. In other words, the electronic device can be configured to have full primary functionality and tracking functionality, to have full tracking functionality while the full primary functionality is disabled, and to have both primary functionality and tracking functionality disabled. For instance, a first standby mode may not be available or feasible for electronic devices with a primary functionality that is either active or inactive. Thus, the availability of a tracking standby mode and the corresponding principles described herein are equally applicable to electronic devices that are unable to be configured to operate in a first standby mode.

FIGS. 7A, 7C, 7E, and 7G illustrate examples of the laptop 600 connected to the tracking system 100 via the mobile device 102 in each of four different operating modes. FIGS. 7B, 7D, 7F, and 7H illustrate the corresponding configuration of a power switch 715 on the laptop 600 corresponding to the four modes.

Figure 7A:
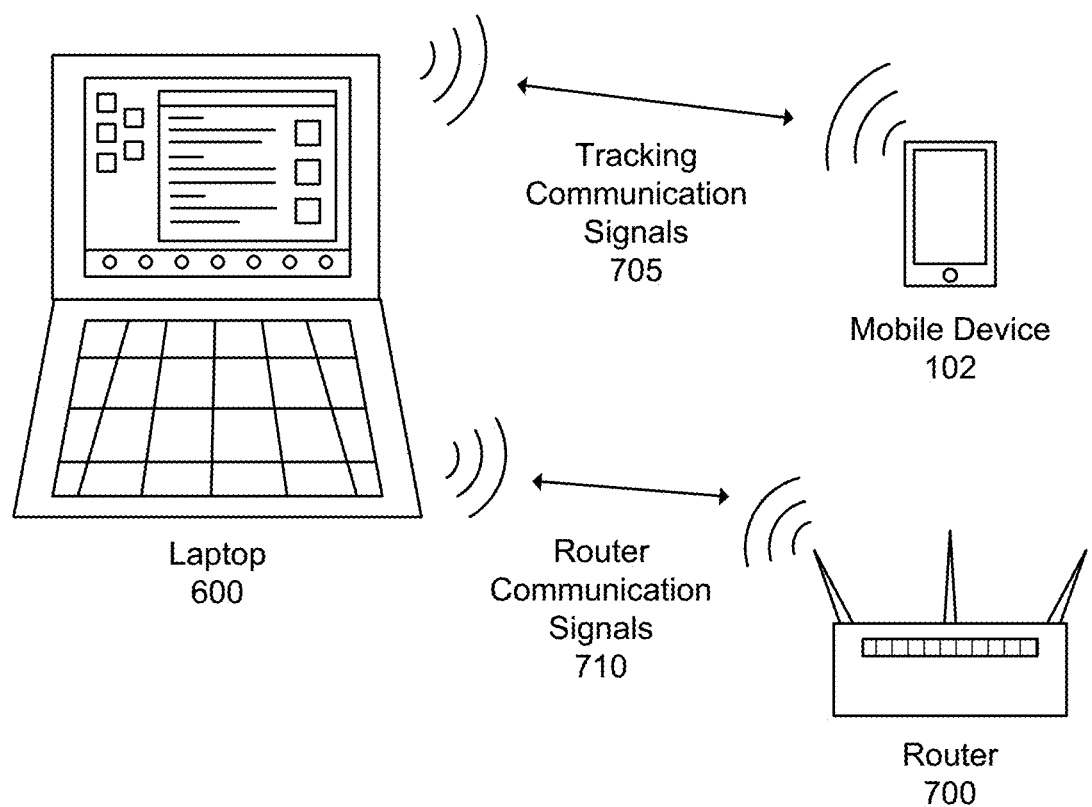
FIG. 7A illustrates an example of a laptop in an "on" mode, according to one embodiment.

FIG. 7A illustrates an example of the laptop 600 configured to operate in an "on" mode, according to one embodiment. The laptop 600 has full functionality, including a primary functionality and a tracking functionality. In the embodiment of FIGS. 7A-7H, the primary functionality of the laptop 600 is network communication with the router 700, and thus the laptop is sending and receiving router communication signals 710 from a router 700 in the embodiment of FIG. 7A. Likewise, in the embodiment of FIGS. 7A-7H, the tracking functionality includes sending and receiving tracking communication signals 705 to and from the mobile device 102, which is connected to the tracking system 100 to monitor the laptop's location. It should be noted that while the laptop 600 can include other primary functionality (such as displaying video, enabling the use of various applications running on the laptop, and the like), the description of the primary functionality described in FIGS. 7A-7H is limited to the communication with the router 700 for the purposes of the simplicity.

Figure 7B:
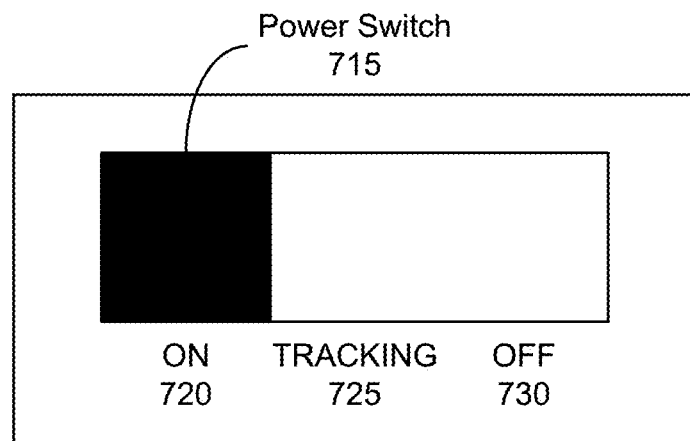
FIG. 7B illustrates an example of the switch of the laptop in the "on" mode, according to one embodiment.

FIG. 7B illustrates an example of a power switch 715 of the laptop 600 configured to operate in the "on" mode, according to one embodiment. In this embodiment, and the embodiments shown in FIGS. 7D, 7F, and 7H, the laptop 600 includes one power switch 715 used to configure the operating mode of the laptop. The power switch 715 is switched to "ON" 720, which indicates that the laptop 600 is configured to operate in the "on" mode, as shown in FIG. 7A.

Figure 7C:
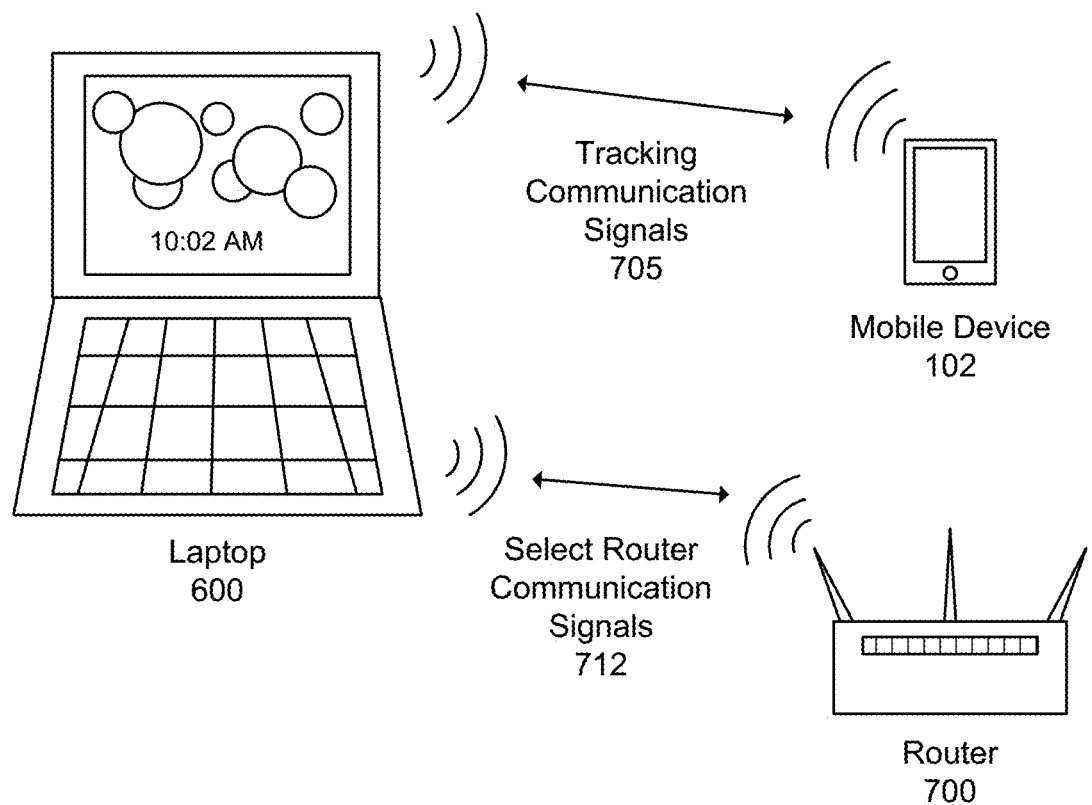
FIG. 7C illustrates an example of a laptop in a standby mode, according to one embodiment.

FIG. 7C illustrates an example of the laptop 600 configured to operate in a first standby mode, according to one embodiment. The laptop 600 has some functionality and can quickly be configured to operate in the "on" mode (for instance, in response to an input from a user). The laptop 600 is still sending and receiving tracking communication signals 705 to and from the mobile device 102 connected to the tracking system 100 to monitor the laptop's 600 location. However, the laptop is only sending and receiving select router communication signals 710 from a router 700. The select router communication signals 712 include fewer communication signals relative to the router communication signals 710. Thus, the laptop 600, when configured to operate in the first standby mode, has a reduced primary functionality relative to operation in the "on" mode.

Figure 7D:
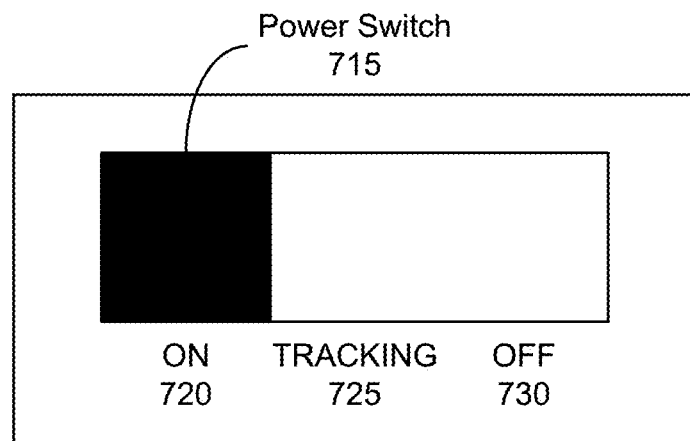
FIG. 7D illustrates an example of the switch of the laptop in the standby mode, according to one embodiment.

FIG. 7D illustrates an example of the power switch 715 of the laptop configured to operate in the first standby mode, according to one embodiment. The power switch 715 is switched to "ON" 720, but in this embodiment, the laptop 600 has transitioned to standby mode, as indicated by the display of a screensaver by the laptop 600 in FIG. 7C, due to lack of user input for a threshold amount of time, or due to an explicit input from a user indicating the laptop 600 should be in standby mode.

Figure 7E:
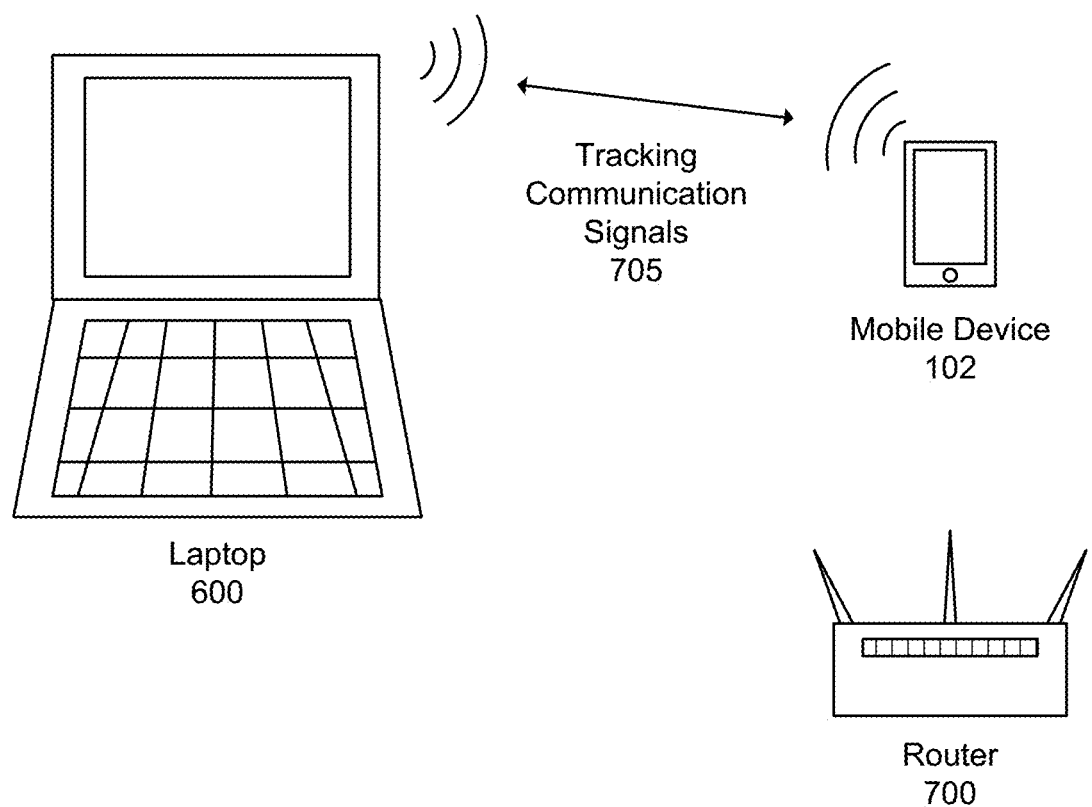
FIG. 7E illustrates an example of a laptop in a tracking standby mode, according to one embodiment.

FIG. 7E illustrates an example of the laptop 600 configured to operate in a tracking standby mode, according to one embodiment. The primary functionality of the laptop 600 has been disabled, but the tracking functionality has been maintained. Thus, the laptop 600 is sending and receiving tracking communication signals 705 to and from the mobile device 102, but the laptop 600 is not communicating with the router 700.

Figure 7F:
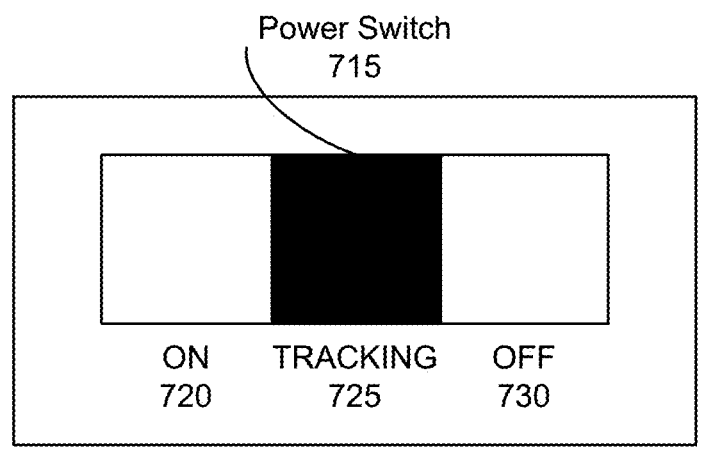
FIG. 7F illustrates an example of the switch of the laptop in the tracking standby mode, according to one embodiment.

FIG. 7F illustrates an example of the power switch 715 of the laptop configured to operate in the tracking standby mode, according to one embodiment. The power switch 715 is switched to "TRACKING" 725, which indicates that the laptop 600 is configured to operate in the tracking standby mode, as shown in FIG. 7E.

Figure 7G:
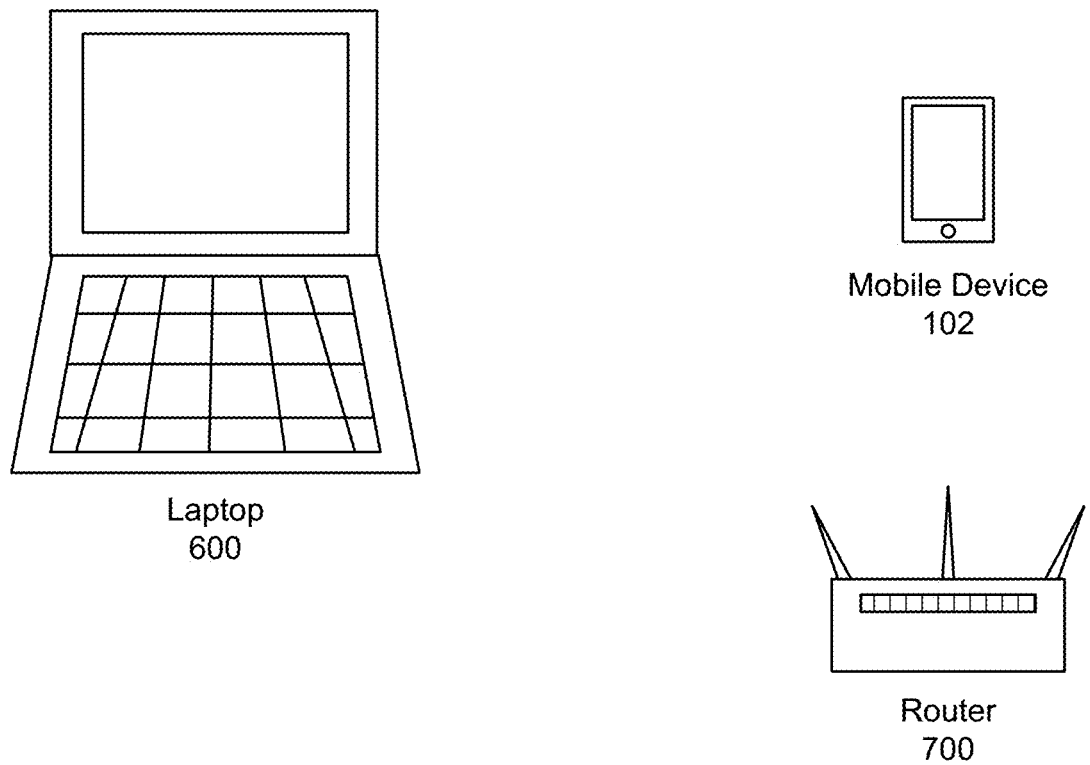
FIG. 7G illustrates an example of a laptop in an "off" mode, according to one embodiment.

FIG. 7G illustrates an example of the laptop 600 configured to operate in an "off" mode, according to one embodiment. The primary functionality and the tracking functionality of the laptop 600 has been disabled, and thus the laptop 600 cannot be tacked via the tracking system 100 since it is not sending any tracking communication signals 705 to the mobile device 102.

Figure 7H:
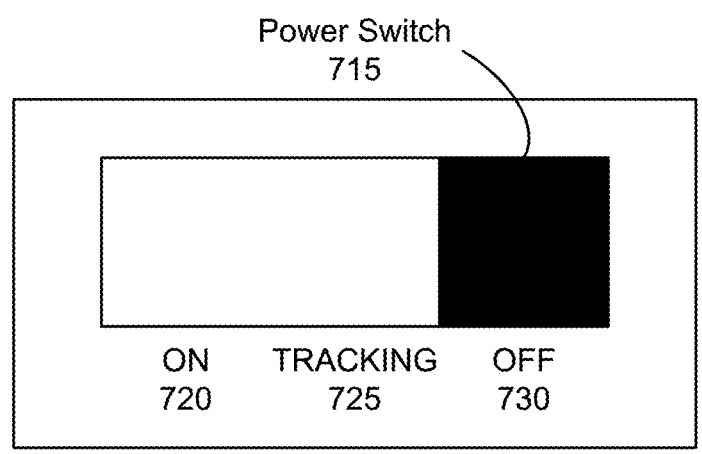
FIG. 7H illustrates the switch of the laptop in the "off" mode, according to one embodiment.

FIG. 7H illustrates an example of the power switch 715 of the laptop 600 configured to operate in the "off" mode, according to one embodiment. The power switch 715 is switched to "OFF" 725, which indicates that the laptop 600 is configured to operate in the "off" mode, as shown in FIG. 7G. Though FIG. 7H illustrates an example of a physical power switch 715 for the laptop 600 that can be configured to operate in "off" mode when switched to "OFF," in some embodiments, the power switch 715 may not be configured to operate in the "off" mode so that the laptop 600 may not be fully disconnected from power and may be tracked. In such embodiments, switching the power switch in the "OFF" position may configure the device to operate in the second standby mode.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. An electronic device, comprising:
a first electronic circuit configured to enable a primary functionality of the electronic device;
a second electronic circuit configured to enable a tracking functionality of the electronic device;
a power source configured to power the first electronic circuit and the second electronic circuit; and
a controller configured to configure the electronic device to operate in each of an on mode, a first standby mode, and a second standby mode;
wherein:
the primary functionality of the electronic device and the tracking functionality of the electronic device are both enabled when the electronic device is configured to operate in the on mode;
the primary functionality of the electronic device is restricted and the tracking functionality of the electronic device is enabled such that the electronic device periodically transmits pairing protocol beacon signals at a first frequency when the electronic device is configured to operate in the first standby mode; and the primary functionality of the electronic device is disabled and the tracking functionality of the electronic device is enabled such that the electronic device periodically transmits pairing protocol beacon signals at a second frequency while otherwise being powered down when the electronic device is configured to operate in the second standby mode, wherein the second frequency is slower than the first frequency.

2. The electronic device of claim 1, wherein the power source is physically separated from the first and second electronic circuits when the electronic device is configured to operate in an off mode, wherein the primary functionality of the electronic device and the tracking functionality of the electronic device are both disabled when the electronic device is configured to operate in the off mode.

3. The electronic device of claim 1, wherein the power source is electrically coupled to the second electronic circuit and is not electrically coupled to the first electronic circuit when the electronic device is configured to operate in the second standby mode.

4. The electronic device of claim 1, wherein the second electronic circuit is a BLE transceiver.

5. The electronic device of claim 1, wherein the electronic device is configured to periodically transmit pairing protocol beacon signals to a mobile device when the tracking functionality is enabled, the mobile device configured to provide a location of the electronic device to a tracking server in response to receiving a pairing protocol beacon signal.

6. The electronic device of claim 5, wherein the mobile device is further configured to provide an identity of the electronic device in response to receiving a pairing protocol beacon signal.

7. The electronic device of claim 1, wherein the controller configures the electronic device to operate in the first standby mode when the electronic device receives a user input associated with the first standby mode.

8. The electronic device of claim 1, wherein the controller configures the electronic device to operate in the first standby mode when the electronic device has not received a user input for more than a threshold amount of time.

9. The electronic device of claim 1, wherein the electronic device is configured to operate in the second standby mode in response to receiving a user input associated with the second standby mode.

10. The electronic device of claim 1, wherein the electronic device is configured to operate in the second standby mode in response to an amount of power of the power source falling below a power threshold.

11. The electronic device of claim 1, wherein the electronic device is configured to operate in the on mode in response to detecting a signal from a second electronic device.

12. A method comprising:
configuring an electronic device to operate in an on mode;
in response to receiving no user input for a threshold amount of time, configuring the electronic device to operate in a first standby mode; and
in response to receiving a second input associated with a second standby mode, configuring the electronic device to operate in the second standby mode;
wherein:
a primary functionality of the electronic device and a tracking functionality of the electronic device are both enabled when the electronic device is configured to operate in the on mode;
the primary functionality of the electronic device is restricted and the tracking functionality of the electronic device is enabled such that the electronic device periodically transmits pairing protocol beacon signals at a first frequency when the electronic device is configured to operate in the first standby mode; and
the primary functionality of the electronic device is disabled and the tracking functionality of the electronic device is enabled such that the electronic device periodically transmits pairing protocol beacon signals at a second frequency while otherwise being powered down when the electronic device is configured to operate in the second standby mode, wherein the second frequency is slower than the first frequency.

13. The method of claim 12, wherein the electronic device includes a power source that is physically separated from a first electronic circuit and a second electronic circuit when the electronic device is configured to operate in an off mode, the first electronic circuit configured to enable the primary functionality of the electronic device and the second electronic circuit configured to enable the tracking functionality of the electronic device, wherein the primary functionality of the electronic device and the tracking functionality of the electronic device are both disabled when the electronic device is configured to operate in the off mode.

14. The method of claim 12, wherein the electronic device includes a power source that is electrically coupled to a second electronic circuit and is not electrically coupled to a first electronic circuit when the electronic device is configured to operate in the second standby mode, the first electronic circuit configured to enable the primary functionality of the electronic device and the second electronic circuit configured to enable the tracking functionality of the electronic device.

15. The method of claim 12, wherein the electronic device includes a second electronic circuit that is a BLE transceiver, the second electronic circuit configured to enable the tracking functionality of the electronic device.

16. The method of claim 12, wherein the electronic device is configured to periodically transmit pairing protocol beacon signals to a mobile device when the tracking functionality is enabled, the mobile device configured to provide a location of the electronic device to a tracking server in response to receiving a pairing protocol beacon signal.

17. The method of claim 16, wherein the mobile device is further configured to provide an identity of the electronic device in response to receiving a pairing protocol beacon signal.

18. The method of claim 12, wherein the electronic device includes a controller that configures the electronic device to operate in the first standby mode when the electronic device receives a user input associated with the first standby mode.

19. The method of claim 12, wherein the electronic device includes a controller that configures the electronic device to operate in the first standby mode when the electronic device has not received a user input for more than a threshold amount of time.

20. The method of claim 12, wherein the electronic device is configured to operate in the second standby mode in response to receiving a user input associated with the second standby mode.

21. The method of claim 12, wherein the electronic device includes a power source and the electronic device is configured to operate in the second standby mode in response to an amount of power of the power source falling below a power threshold.

22. The method of claim 12, wherein the electronic device is configured to operate in the on mode in response to detecting a signal from a second electronic device.

\* \* \* \* \*